E. HOPKINSON & T. MIDGLEY.
APPARATUS FOR CURING OR VULCANIZING RUBBER GOODS.
APPLICATION FILED DEC. 19, 1905.
901,006.
Patented Oct. 13, 1908.
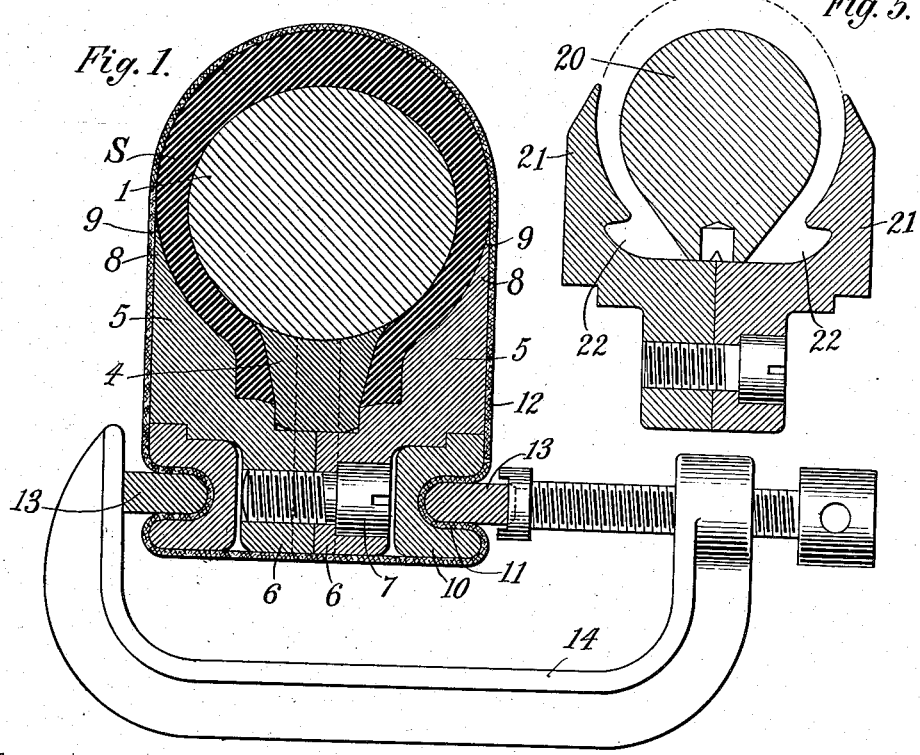
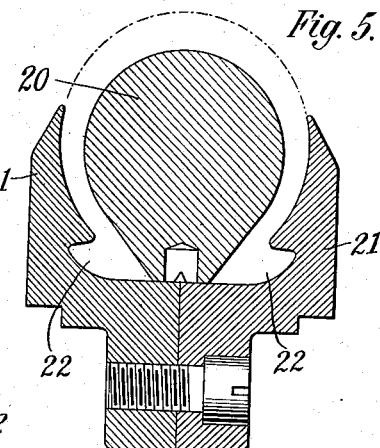
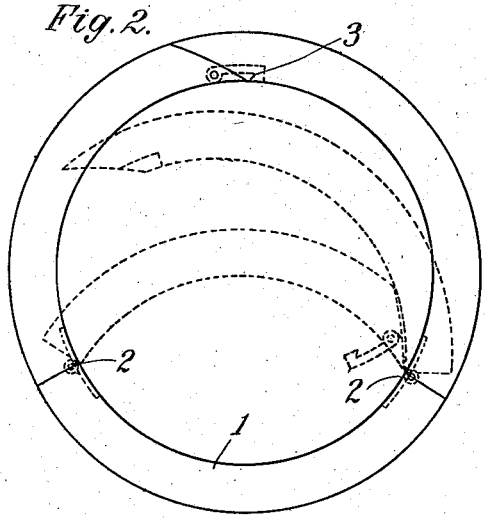
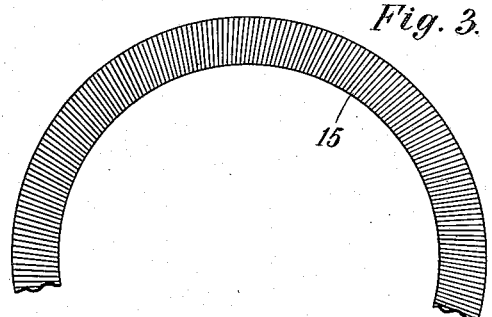
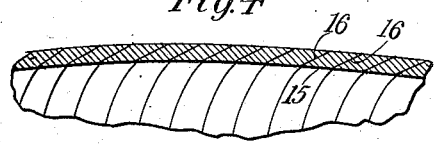

UNITED STATES PATENT OFFICE.

ERNEST HOPKINSON, OF EAST ORANGE, NEW JERSEY, AND THOMAS MIDGLEY, OF HARTFORD, CONNECTICUT; SAID HOPKINSON ASSIGNOR TO THE HARTFORD RUBBER WORKS COMPANY, OF HARTFORD, CONNECTICUT, A CORPORATION OF CONNECTICUT.

APPARATUS FOR CURING OR VULCANIZING RUBBER GOODS.

No. 901,006.     Specification of Letters Patent.     Patented Oct. 13, 1908.

Application filed December 19, 1905. Serial No. 292,443.

*To all whom it may concern:*

Be it known that we, ERNEST HOPKINSON and THOMAS MIDGLEY, citizens of the United States, and residing, respectively, in the city of East Orange, county of Essex, and State of New Jersey, and city of Hartford, county of Hartford, and State of Connecticut, have invented new and useful Improvements in Apparatus for Curing or Vulcanizing Rubber Goods, of which the following is a specification.

This invention relates to apparatus for curing or vulcanizing rubber goods, and it relates especially to apparatus employed in the "curing" of the outer shoes or casings of pneumatic tires for vehicles.

The object of the invention is to provide improved apparatus whereby the outer shoes or casings of pneumatic tires may be conveniently and effectively "cured" or vulcanized by means of "an open heat", that is, by the use of live steam which is allowed to come into direct contact with the rubber of the tire.

In the following specification several slightly different forms of apparatus are described in connection with the accompanying drawings forming part of the specification, in which corresponding parts are designated by similar characters of reference throughout; and the novel features of the invention are clearly pointed out in the appended claims, it being understood that changes in the form, proportions, and mode of assemblage of the elements of the apparatus may be varied within the scope of the claims without departing from the spirit of the invention or sacrificing the advantages thereof.

In the drawings: Figure 1 is a cross-sectional view through the complete apparatus as applied to an unvulcanized rubber shoe or casing for a tire of the "Dunlop" type. Fig. 2 is a view in elevation of one form of collapsible core upon which the outer shoe or casing of the tire is placed to hold it in shape during the process of vulcanization. Fig. 3 is a view in side elevation of a portion broken away to show the interior construction of another form of core for supporting the tire casing or shoe. Fig. 4 is a detailed view in cross-section of the strip of metal or other suitable material used in forming a core of the type illustrated in Fig. 3. Fig. 5 is a sectional view of a portion of the apparatus employed in connection with a tire casing of the "clencher" type.

In order to effect the curing or vulcanization of tire shoes or casings by means of live steam in what is termed the open heat process, it is necessary to support the casings in such manner that they will retain their proper form, and it is also desirable to subject the casings to a considerable degree of pressure during the curing or vulcanizing process to insure compactness and homogeneity of structure, but at the same time to permit direct access of the live steam to the rubber of the tire shoes or casings, particularly to the portions of the shoes or casings which will come in contact with the road and be subjected to the heaviest wear. These conditions are all met in the apparatus which is hereinafter described and which forms the present invention. The outer shoe or casing of the tire is supported upon a core of such construction that it may be readily introduced within the shoe or casing, and clamping devices of suitable construction are provided to hold the tire shoe or casing in close engagement with the core. These clamping devices cover only those portions of the shoe or casing which lie adjacent to the wheel rim and leave the portion of the shoe or casing which forms the "tread" thereof and must receive the brunt of the wear, completely exposed. The pressure desired over the tread portion of the shoe or casing is obtained by means of a wrapping of burlap, duck, or other suitable porous fabric, which is placed over both the tire casing and the clamping devices and is placed under tension sufficient to produce the desired degree of pressure upon that portion of the surface of the tire shoe or casing which is not covered by the clamping devices.

Referring to the drawings by the reference characters marked thereon, and more particularly to Fig. 1, 1 designates the core upon which the outer shoe S of the tire is placed. The core 1 is formed in sections, as shown in Fig. 2, the sections being suitably connected and of such length that the core may be collapsed as indicated in dotted lines in Fig. 2 to permit its easy introduction into the shoe or casing. The sections of the core are preferably connected by means of hinges 2—2 except at one joint where the meeting ends of the cross-sections are overlapped, as shown, and a latch 3 is provided to hold them in proper relation when the core is in position. Between the margins of the shoe or casing shown in Fig. 1 an abutment member 4, which is of collapsible construction like the core, is placed, but it is obvious that the abutment member may, if desired, be permanently attached to or form a part of the core. Clamping members 5—5 of annular form secure the tire shoe or casing in position upon the core and abutment member and determine the form of the margins of the shoe or casing, coöperating with the abutment member 4 to form a mold for the margins of the casing. These clamping members 5 are provided with inwardly extending portions 6 which meet and receive transverse screws or bolts 7 by means of which the clamping members are drawn into engagement with the shoe or casing and the abutment member 4. The outer portions 8 of the clamping members 5 are made concave on the surfaces which contact with the shoe or casing to correspond to the curvature of the shoe or casing and at their outer margins terminate in thin edges 9 and the exposed surfaces of the members 5 are tangential to the surface of the casing. Each of the clamping members 5 is shown in Fig. 1 as suitably shaped adjacent to the inner portion 6 to receive an annular member 10 which presents on the exposed lateral face a channel 11, but it is obvious that the channeled member 11 and the adjacent clamping member 5 may be made integral, if desired. When a tire shoe or casing has been placed in position upon the core 1 and the abutment member 4, and the clamping members 5 and the channeled members 11 have all been brought into their proper positions, a wrapping or cover 12 of fabric is placed over the entire structure. This wrapping or cover is preferably simply a lengthy strip of fabric wound spirally around the tire shoe or casing and the devices shown in Fig. 1 in connection therewith. After the wrapping or cover has been applied, it is placed under tension by means of two annuli or rings 13 of suitable dimensions to enter the channels 11 and force the wrapping or cover 12 thereinto. The rings or annuli 13 are forced into the channels 11 by means of any suitable devices for that purpose, such as the ordinary screw clamps 14 which are illustrated. After the rings 13 have been forced into the channels 11 to the depth required to produce the desired tension of the cover or wrapping 12, the entire structure is ready for introduction into the vulcanizing drum or cylinder.

As will be seen from an inspection of Fig. 1, a tire shoe or casing clamped upon a core by means of the clamping devices illustrated and then wrapped or otherwise covered with a covering of porous fabric subjected to considerable tension will be exposed to the direct action of the steam in the vulcanizing drum or cylinder over all of the surface of the tire shoe or casing which is subjected to much wear when the tire is in use. The porous fabric 12 permits free access of the penetrating steam to the tread portion of the tire shoe or casing and also to the portion of the shoe or casing which is subjected to greatest flexure when in use. Consequently, the beneficial results of curing or vulcanizing with live steam are obtained at the points where they are most needed, and the entire curing process is effected in a single operation, instead of several operations, as has been the case heretofore, so far as we are aware. Moreover, the overcuring of the thinner portions of the shoe or casing which has been one of the principal drawbacks in the manufacture of shoes or casings with open-cured treads hitherto, is entirely avoided. After the tire shoe or casing has been exposed to the action of the steam in the vulcanizing drum or cylinder for a sufficient length of time, the entire structure shown in Fig. 1 is removed from the drum or cylinder and the shoe or casing is disengaged from the supporting and holding devices, the order of removal of the different structures being the reverse of the order of application.

Instead of using a solid core formed in sections, as shown in Fig. 2, we may use instead a core of the character illustrated in Fig. 3, which consists of a single strip 15 of spring metal having the edges beveled as shown at 16 in Fig. 4 and formed into a spiral with the edges of adjacent whirls overlapped. The ends of the spiral so formed are connected so as to make an endless structure, and the beveled edges of the strip make the core sufficiently compressible to be easily insertible into a tire shoe or casing or removable therefrom. With a core of the construction shown in Fig. 3 an abutment member such as that shown at 4 in Fig. 1 should be used in the curing of shoes or casings of the "Dunlop" type, and an abutment member of somewhat different contour is required if tire shoes or casings of the "clencher" type are to be cured.

In Fig. 5 we have illustrated a core and clamping members of suitable form for use in curing shoes or casings of the "clencher" type. The core 20 is collapsible, being made in sections like the core already above described, and instead of being circular in cross-section, it is shaped to correspond to the interior of an ordinary clencher tire casing. The clamping members 21 are provided with the surfaces for contact with the tire shoe or casing which are characterized by channels 22 of suitable shape to receive, form and give shape to the beads or ribs at the margins of the shoe or casing. With the core and clamping devices shown in Fig. 5, channel members and clamping devices such as those shown in Fig. 1 may be employed, and the cover or wrapping of textile fabric is applied in precisely the same manner.

Considerable variation in the structure of the apparatus described and illustrated may be made without departing from the spirit of the invention. The forms of core illustrated can be altered in various ways, and any suitable means for holding the tire shoe or casing in the form which it is intended to retain may be adopted. In like manner the details of the clamping devices and the means employed for subjecting the cover to tension may be modified. In every case, however, the devices for supporting and securing the shoe or casing must be adapted to hold the same firmly and yet leave the tread of the shoe or casing exposed so that direct access thereto through the pores of the porous covering may be permitted.

Having thus described our invention, what we claim as new and desire to secure by Letters Patent is:

1. The combination in apparatus of the character specified, of a core adapted for insertion within a tire shoe or casing, means for clamping the margins of the casing in proper relation to the core while leaving the tread of the shoe or casing exposed, and a wrapping or cover extending over the exposed portion of the tire shoe or casing and the clamping devices.

2. The combination in apparatus of the character specified, of a core adapted for insertion within a tire shoe or casing, means for clamping the margins of the casing in proper relation to the core while leaving the tread of the shoe or casing exposed, a wrapping or cover for the tire shoe or casing of textile fabric, and means for subjecting the cover of textile fabric to lateral tension applied at the side.

3. The combination in apparatus of the character specified, of a core adapted for insertion within a tire shoe or casing, clamping members for engagement with the margins of the casing and having their outer exposed lateral surfaces tangent to the surface of the casing, a porous wrapping or cover for the tire shoe or casing, and means for securing the wrapping or cover in position.

4. The combination in apparatus of the character specified, of a structure adapted to support and hold a tire shoe or casing and leave the tread surface exposed, said holding structure presenting lateral channels, a porous wrapping or cover for the shoe or casing and the holding and supporting structure, and means for forcing said cover or wrapping into said channels to place the said wrapping or cover under tension.

5. The combination in apparatus of the character specified, of devices for securely holding and supporting a tire shoe or casing in the form to be permanently held thereby, said devices leaving the tread portion of said shoe or casing exposed, a cover of porous material adapted to fit snugly on the exposed portion of the shoe or casing, and means for putting a lateral tension on said cover applied at the sides for the purpose of holding the same in position.

In testimony whereof, we affix our signatures in the presence of two witnesses.

ERNEST HOPKINSON.
THOMAS MIDGLEY.

Witnesses:
BAXTER MORTON,
H. RICHARD WÖBSE.